(12) United States Patent
Liu et al.

(10) Patent No.: US 7,938,876 B2
(45) Date of Patent: May 10, 2011

(54) LOW COEFFICIENT OF THERMAL EXPANSION MATERIALS INCLUDING NONSTOICHIOMETRIC CORDIERITE FIBERS AND METHODS OF MANUFACTURE

(75) Inventors: James Jenq Liu, Mason, OH (US); William M. Carty, Alfred Station, NY (US); Bilal Zuberi, Cambridge, MA (US); Sunilkumar C. Pillai, North Billerica, MA (US)

(73) Assignee: GE02 Technologies, Inc., Woburn, MA (US)

( * ) Notice: Subject to any disclaimer, the term of this patent is extended or adjusted under 35 U.S.C. 154(b) by 331 days.

(21) Appl. No.: 12/104,969

(22) Filed: Apr. 17, 2008

(65) Prior Publication Data

US 2008/0242530 A1 Oct. 2, 2008

Related U.S. Application Data

(63) Continuation-in-part of application No. 11/323,429, filed on Dec. 30, 2005, now abandoned.

(60) Provisional application No. 60/737,237, filed on Nov. 16, 2005.

(51) Int. Cl.
*B01D 39/20* (2006.01)
*B01D 46/00* (2006.01)
*C04B 35/03* (2006.01)

(52) U.S. Cl. ......... 55/523; 55/282.3; 55/385.3; 55/524; 55/DIG. 5; 55/DIG. 30; 60/311; 422/180; 423/213.5; 264/44; 264/628; 264/630; 264/631; 264/DIG. 48; 501/9; 501/95.1

(58) Field of Classification Search ............ 55/282.2, 55/282.3, 385.3, 486, 487, 523, 524, DIG. 5, 55/DIG. 10, DIG. 30; 60/297, 299, 301, 311; 422/177, 180; 423/213.2, 213.5, 327.2; 428/116, 117, 118; 502/439; 264/43, 44, 628, 630, 631, DIG. 48; 501/5, 8, 9, 95.1

See application file for complete search history.

(56) References Cited

U.S. PATENT DOCUMENTS

| | | | |
|---|---|---|---|
| 1,335,466 | A | 3/1920 | Stevenson |
| 1,533,813 | A | 4/1925 | Schroeder |
| 1,993,821 | A | 3/1935 | Benner et al. |
| 2,752,001 | A | 6/1956 | Muller |
| 3,790,654 | A * | 2/1974 | Bagley ............ 264/177.11 |
| 3,819,334 | A | 6/1974 | Yoshida et al. |

(Continued)

FOREIGN PATENT DOCUMENTS

CN 1349839 5/2002

(Continued)

OTHER PUBLICATIONS

"Fiber-reinforced SiC", *Jpn. Technol. Highlights*, vol. 6, No. 4, ISSN: 1060-8117, (Feb. 22, 1995), 15.

(Continued)

*Primary Examiner* — Jason M Greene

(57) ABSTRACT

A fibrous ceramic material comprises a plurality of fibers having a $R_xMg_2Al_{4+x}Si_{5-x}O_{18}$ or $R_xMg_{2-x}Al_4Si_5O_{18}$ compositional structure. The fibrous ceramic material is form by combining two or more $R_xMg_2Al_{4+x}Si_{5-x}O_{18}$ or $R_xMg_{2-x}Al_4Si_5O_{18}$ precursors in which at least one of the two or more $R_xMg_2Al_{4+x}Si_{5-x}O_{18}$ or $R_xMg_{2-x}Al_4Si_5O_{18}$ precursors is in fiber form. The fibrous ceramic material is shaped to form a fibrous body in which at least about 20% of all fibers therein are aligned in a substantially common direction.

22 Claims, 6 Drawing Sheets

U.S. PATENT DOCUMENTS

| | | | |
|---|---|---|---|
| 3,899,555 | A | 8/1975 | Takao et al. |
| 3,912,658 | A | 10/1975 | Kaneko et al. |
| 3,961,907 | A | 6/1976 | Close et al. |
| 4,047,965 | A | 9/1977 | Karst et al. |
| 4,053,011 | A | 10/1977 | Riewald et al. |
| 4,071,594 | A | 1/1978 | Pearson et al. |
| 4,169,911 | A | 10/1979 | Yoshida et al. |
| 4,329,162 | A | 5/1982 | Pitcher, Jr. |
| 4,402,893 | A | 9/1983 | Kitamura et al. |
| 4,409,284 | A | 10/1983 | Sugino et al. |
| 4,416,676 | A * | 11/1983 | Montierth ................. 55/523 |
| 4,417,908 | A | 11/1983 | Pitcher, Jr. |
| 4,419,108 | A * | 12/1983 | Frost et al. ................. 95/286 |
| 4,420,316 | A | 12/1983 | Frost et al. |
| 4,448,833 | A | 5/1984 | Yamaguchi et al. |
| 4,608,361 | A | 8/1986 | Kanamori et al. |
| 4,652,286 | A | 3/1987 | Kusuda et al. |
| 4,761,323 | A | 8/1988 | Muhlratzer et al. |
| 4,810,458 | A | 3/1989 | Oshima |
| 4,824,711 | A | 4/1989 | Cagliostro et al. |
| 4,828,785 | A | 5/1989 | Newkirk et al. |
| 4,833,115 | A | 5/1989 | Koschlig et al. |
| 4,868,142 | A | 9/1989 | Waisala |
| 4,966,873 | A | 10/1990 | Iida et al. |
| 4,968,467 | A | 11/1990 | Zievers |
| 5,053,092 | A | 10/1991 | Lachman |
| 5,070,588 | A | 12/1991 | Miwa et al. |
| 5,075,160 | A | 12/1991 | Stinton et al. |
| 5,078,818 | A | 1/1992 | Han et al. |
| 5,098,455 | A | 3/1992 | Doty et al. |
| 5,123,243 | A | 6/1992 | Baddour |
| 5,126,431 | A | 6/1992 | Nesheiwat |
| 5,153,057 | A | 10/1992 | Corbett |
| 5,194,407 | A | 3/1993 | Waisala et al. |
| 5,194,414 | A | 3/1993 | Kuma |
| 5,196,120 | A | 3/1993 | White |
| 5,207,807 | A | 5/1993 | Manfre et al. |
| 5,249,948 | A | 10/1993 | Koslow |
| 5,251,564 | A | 10/1993 | Rim et al. |
| 5,260,035 | A | 11/1993 | Lachman et al. |
| 5,298,046 | A | 3/1994 | Peisert |
| 5,316,710 | A | 5/1994 | Tasaki et al. |
| 5,322,537 | A | 6/1994 | Nakamura et al. |
| 5,335,712 | A | 8/1994 | Corbett et al. |
| 5,338,253 | A | 8/1994 | Damsohn et al. |
| 5,348,987 | A | 9/1994 | Kato et al. |
| 5,376,341 | A | 12/1994 | Gulati |
| 5,488,017 | A | 1/1996 | Szweda et al. |
| 5,492,580 | A | 2/1996 | Frank |
| 5,518,678 | A | 5/1996 | Miyamoto et al. |
| 5,518,833 | A | 5/1996 | Repplinger et al. |
| 5,545,297 | A | 8/1996 | Andersen et al. |
| 5,549,725 | A | 8/1996 | Kasai et al. |
| 5,549,859 | A | 8/1996 | Andersen et al. |
| 5,611,831 | A | 3/1997 | Matsuoka et al. |
| 5,622,041 | A | 4/1997 | Feeley et al. |
| 5,623,013 | A | 4/1997 | Tanaka et al. |
| 5,629,067 | A | 5/1997 | Kotani et al. |
| 5,662,731 | A | 9/1997 | Andersen et al. |
| 5,681,373 | A | 10/1997 | Taylor et al. |
| 5,707,584 | A | 1/1998 | Terpstra et al. |
| 5,714,226 | A | 2/1998 | Disselbeck |
| 5,750,026 | A | 5/1998 | Gadkaree et al. |
| 5,759,219 | A | 6/1998 | Rink et al. |
| 5,820,833 | A | 10/1998 | Kawamura |
| 5,851,326 | A | 12/1998 | Custer et al. |
| 5,853,439 | A | 12/1998 | Gieseke et al. |
| 5,900,207 | A | 5/1999 | Danforth et al. |
| 5,914,187 | A | 6/1999 | Naruse et al. |
| 5,948,257 | A | 9/1999 | Custer et al. |
| 5,998,328 | A | 12/1999 | Dawes et al. |
| 6,040,266 | A | 3/2000 | Fay et al. |
| 6,057,030 | A | 5/2000 | Mano |
| 6,117,518 | A | 9/2000 | Cawse et al. |
| 6,155,432 | A | 12/2000 | Wilson et al. |
| 6,179,460 | B1 | 1/2001 | Burkhardt et al. |
| 6,194,066 | B1 | 2/2001 | Hoffman |
| 6,228,293 | B1 | 5/2001 | Kriegsmann et al. |
| 6,238,618 | B1 | 5/2001 | Brundage et al. |
| 6,261,510 | B1 | 7/2001 | Terpstra et al. |
| 6,300,263 | B1 * | 10/2001 | Merkel ................. 501/9 |
| 6,321,915 | B1 | 11/2001 | Wilson et al. |
| 6,365,092 | B1 | 4/2002 | Backa |
| 6,375,450 | B1 | 4/2002 | Golomb et al. |
| 6,379,446 | B1 | 4/2002 | Andersen et al. |
| 6,423,537 | B1 | 7/2002 | Soria et al. |
| 6,444,006 | B1 | 9/2002 | Haberkamp et al. |
| 6,471,394 | B2 | 10/2002 | Kesig |
| 6,506,336 | B1 | 1/2003 | Beall et al. |
| 6,547,967 | B1 | 4/2003 | Adler et al. |
| 6,566,290 | B2 | 5/2003 | Beall et al. |
| 6,582,490 | B2 | 6/2003 | Miller et al. |
| 6,613,384 | B1 | 9/2003 | Waller |
| 6,651,773 | B1 | 11/2003 | Marocco |
| 6,669,751 | B1 | 12/2003 | Ohno et al. |
| 6,716,376 | B1 | 4/2004 | Haug et al. |
| 6,860,917 | B2 | 3/2005 | Henrichsen et al. |
| 6,881,361 | B1 | 4/2005 | Schulze et al. |
| 6,899,777 | B2 | 5/2005 | Vaidyanathan et al. |
| 6,935,461 | B2 | 8/2005 | Marocco |
| 6,946,013 | B2 | 9/2005 | Alward et al. |
| 6,991,672 | B2 | 1/2006 | Marrecau |
| 6,991,673 | B2 | 1/2006 | Wastijn et al. |
| 7,041,359 | B2 | 5/2006 | Hijikata |
| 7,052,532 | B1 | 5/2006 | Liu et al. |
| 7,052,760 | B2 | 5/2006 | Hijikata |
| 7,078,004 | B2 | 7/2006 | Voss et al. |
| 7,078,086 | B2 | 7/2006 | Hijikata |
| 7,083,842 | B2 | 8/2006 | Masukawa et al. |
| 7,090,715 | B2 | 8/2006 | Chung et al. |
| 7,112,050 | B2 | 9/2006 | Bernas et al. |
| 7,138,002 | B2 | 11/2006 | Hamanaka et al. |
| 7,138,003 | B2 | 11/2006 | Ichikawa et al. |
| 7,179,516 | B2 | 2/2007 | Ichikawa |
| 7,404,840 | B2 | 7/2008 | Wood et al. |
| 7,486,962 | B2 | 2/2009 | Zuberi et al. |
| 7,510,755 | B2 | 3/2009 | Masukawa et al. |
| 7,572,311 | B2 * | 8/2009 | Zuberi ................. 55/523 |
| 7,578,865 | B2 | 8/2009 | Zuberi et al. |
| 2001/0037972 | A1 | 11/2001 | Quick et al. |
| 2002/0014723 | A1 | 2/2002 | Wallin et al. |
| 2002/0157358 | A1 * | 10/2002 | Noda et al. ................. 55/282.3 |
| 2003/0101701 | A1 | 6/2003 | Henrichsen et al. |
| 2003/0127393 | A1 | 7/2003 | Tepper et al. |
| 2003/0131759 | A1 | 7/2003 | Francis et al. |
| 2003/0178357 | A1 | 9/2003 | Wolff et al. |
| 2004/0029707 | A1 | 2/2004 | Beall et al. |
| 2004/0103627 | A1 | 6/2004 | Dullien et al. |
| 2004/0115392 | A1 | 6/2004 | Miyakawa et al. |
| 2004/0139734 | A1 | 7/2004 | Schmeichel et al. |
| 2004/0194505 | A1 | 10/2004 | Wang et al. |
| 2004/0231307 | A1 * | 11/2004 | Wood et al. ................. 55/523 |
| 2004/0250683 | A1 | 12/2004 | Soane et al. |
| 2005/0020432 | A1 | 1/2005 | Roy et al. |
| 2005/0040003 | A1 | 2/2005 | Kienzle et al. |
| 2005/0042151 | A1 | 2/2005 | Alward et al. |
| 2005/0049362 | A1 | 3/2005 | Buckley et al. |
| 2005/0069469 | A1 | 3/2005 | Fu et al. |
| 2005/0074374 | A1 | 4/2005 | Ogura |
| 2005/0102987 | A1 | 5/2005 | Kudo |
| 2005/0109023 | A1 | 5/2005 | Kudo et al. |
| 2005/0126140 | A1 | 5/2005 | Ito et al. |
| 2005/0120691 | A1 | 6/2005 | Miwa |
| 2005/0181193 | A1 | 8/2005 | Lenke et al. |
| 2005/0217228 | A1 | 10/2005 | Beall et al. |
| 2005/0230029 | A1 | 10/2005 | Vaidyanathan et al. |
| 2005/0266991 | A1 | 12/2005 | Ohno et al. |
| 2005/0271920 | A1 | 12/2005 | Eshraghi et al. |
| 2006/0075731 | A1 * | 4/2006 | Ohno et al. ................. 55/523 |
| 2006/0154057 | A1 | 7/2006 | Nonninger |
| 2006/0272306 | A1 | 12/2006 | Kirk et al. |
| 2006/0292393 | A1 | 12/2006 | Kunieda |
| 2007/0032370 | A1 | 2/2007 | Weisensel et al. |
| 2007/0044443 | A1 * | 3/2007 | Nixdorf et al. ................. 55/523 |
| 2007/0108647 | A1 | 5/2007 | Zuberi et al. |
| 2007/0111878 | A1 | 5/2007 | Zuberi et al. |

| | | | |
|---|---|---|---|
| 2007/0141255 | A1 | 6/2007 | Zuberi |
| 2007/0261557 | A1 | 11/2007 | Gadkaree et al. |
| 2009/0041975 | A1 | 2/2009 | Kodama et al. |

FOREIGN PATENT DOCUMENTS

| | | |
|---|---|---|
| EP | 0425827 | 5/1991 |
| EP | 0552715 | 7/1993 |
| EP | 0562597 | 9/1993 |
| EP | 0635298 | 1/1995 |
| EP | 0728521 | 8/1996 |
| EP | 00776696 | 6/1997 |
| EP | 01338326 | 8/2003 |
| EP | 01440722 | 7/2004 |
| EP | 01541216 | 6/2005 |
| GB | 2168338 | 6/1986 |
| GB | 2176179 | 12/1986 |
| JP | 61230747 | 10/1986 |
| JP | 63242980 | 10/1988 |
| JP | 03258347 | 11/1991 |
| JP | 06031177 | 2/1994 |
| JP | 07000757 | 1/1995 |
| JP | 2001-252529 | 9/2001 |
| KR | 2001016633 | 3/2001 |
| WO | WO-97/12410 | 4/1997 |
| WO | WO-97/12844 | 4/1997 |
| WO | WO-2006070540 | 7/2006 |
| WO | 2007054697 | 5/2007 |

OTHER PUBLICATIONS

"Porosity reduces CMC properties", *Adv. Compos. Bull.*, ISSN: 0951-953X,(Feb. 1995),2-3.

"Rapid preforming developed for metal matrix composites", *High-Performance Composites, vol. 9, No. 1*, ISSN: 1081-9223,(Jan.-Feb. 2001),60.

Gulati, Suresh T., "Physical Durability of Thin Wall Ceramic Substrates", *SAE Technical Paper Series 982635*, (Oct. 1998).

"Diesel Filter Materials", *DieselNet Technology Guide*, www.DieselNet.com,(Jan. 2003).

"Wall-Flow Monoliths", *DieselNet Technology Guide*, www.DieselNet.com,(Sep. 2005).

"Ceramic Catalyst Substrates", *DieselNet Technology Guide*, www.DieselNet.com,(Apr. 1997).

"Ceramic Fibers and Cartridges", *DieselNet Technology Guide*, www.DieselNet.com.(Jul. 2001).

Cooke, Theodore F., "Inorganic Fibers—A Literature Review", *J. Am. Ceram. Soc.*, 74 (12), (1991),2959-2978.

Miller, Robert K., et al., "Design, Development and Performance of a Composite Diesel Particulate Filter", *SAE Technical Paper Series*, 2002-01-0323,(Mar. 2002).

Li, Cheng G., et al., "Properties and Performance of Diesel Particulate Filters of an Advanced Ceramic Material", *SAE Technical Paper Series*, 2004-01-0323,(Mar. 2002).

Blackburn, Stuart et al., "Mullite-Alumina Composites by Extrusion", *J. Am. Ceram. Soc.* 75[4], (1992),953-957.

* cited by examiner

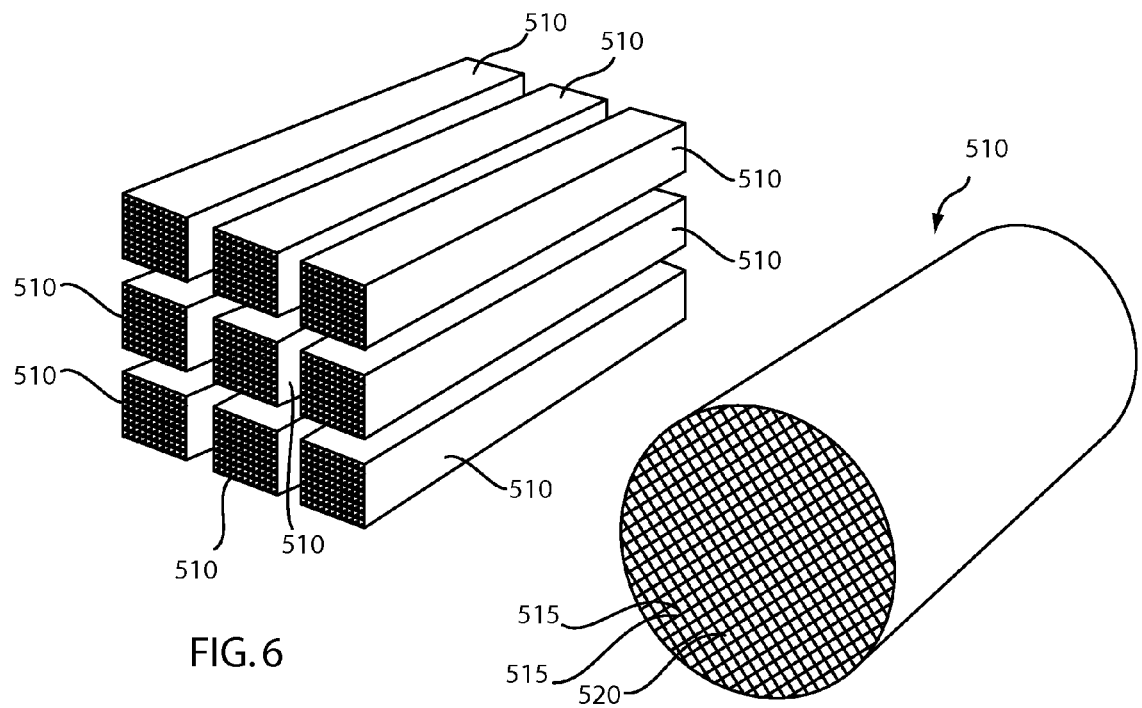
FIG. 6
FIG. 5
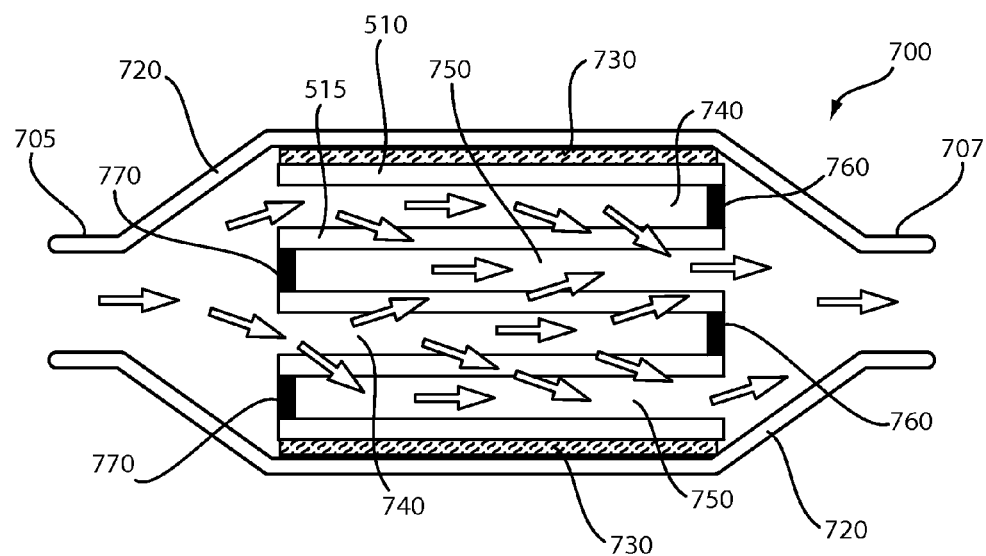
FIG. 7

US 7,938,876 B2

LOW COEFFICIENT OF THERMAL EXPANSION MATERIALS INCLUDING NONSTOICHIOMETRIC CORDIERITE FIBERS AND METHODS OF MANUFACTURE

RELATED APPLICATIONS

This application is a continuation-in-part of application Ser. No. 11/323,429, filed on Dec. 30, 2005 and entitled "Extruded Porous Substrate and Products Using the Same." application Ser. No. 11/323,429 claims the benefit of provisional application Ser. No. 60/737,237, filed on Nov. 16, 2005. The entire disclosures of application Ser. Nos. 11/323,429 and 60/737,237 are incorporated herein by reference.

FIELD OF THE INVENTION

The invention generally relates to a fibrous ceramic material, and more particularly to a low coefficient of thermal expansion fibrous material including a plurality of nonstoichiometric cordierite fibers and methods of manufacturing the fibrous material.

BACKGROUND

Advanced ceramic materials are commonly utilized in systems located in hostile environments, such as, for example, automotive engines (e.g., catalytic converters), aerospace applications (e.g., space shuttle titles), refractory operations (e.g., firebrick) and electronics (e.g., capacitors, insulators). Porous ceramic bodies are of particular use as filters in these environments. For example, today's automotive industry uses ceramic honeycomb substrates (i.e., a porous ceramic body) to host catalytic oxidation and reduction of exhaust gases, and to filter particulate emissions. Ceramic honeycomb substrates provide high specific surface area for filtration and support for catalytic reactions and, at the same time, are stable and substantially structurally sound at high operating temperatures associated with an automotive engine environment.

In general, ceramic materials, such as for example, cordierite, are inert materials that perform well in high temperature environments. However, ceramic materials are not immune to thermal stresses, such as those stresses generated from cycling between ambient temperature and high temperature applications. Thus, ceramic filters are known to degrade making them inefficient and ineffective for today's applications.

SUMMARY OF THE INVENTION

In general, embodiments described herein feature a fibrous ceramic material that can be utilized in a variety of applications, including as a filter in an automotive engine environment. The fibrous ceramic material includes a plurality of nonstoichiometric cordierite fibers (i.e., fibers having a compositional structure of $R_xMg_2Al_{4+2x}Si_{5-x}O_{18}$ or $R_xMg_{2-x}Al_4Si_5O_{18}$ where x is greater than 0 and R is an element other than Mg, Al, Si, or O). Embodiments described herein also feature methods of making the fibrous ceramic material. Specifically, in one embodiment, the fibrous ceramic material is made by forming the $R_xMg_2Al_{4+2x}Si_{5-x}O_{18}$ or $R_xMg_{2-x}Al_4Si_5O_{18}$ fibers via a reaction between two or more precursor materials, wherein at least one of the two or more precursor materials is in the form of a fiber. The plurality of $R_xMg_2Al_{4+2x}Si_{5-x}O_{18}$ or $R_xMg_{2-x}Al_4Si_5O_{18}$ fibers made by reaction are extruded or otherwise shaped into a fibrous body. During extrusion or shaping, it is believed that fiber alignment occurs resulting in a decrease of the coefficient of thermal expansion (CTE) in at least one direction of the fibrous body. As a result of the decrease in CTE, a porous, fibrous ceramic body with minimal cracking and minimal expansion at high temperatures can be generated. In addition, in certain embodiments, the CTE can be further lowered by changing the compositional structure of the fibers. For example, by altering the compositional structure of cordierite from its stoichiometric form, one can manipulate the crystal lattice of the fibrous material resulting in directional changes to the value of the CTE.

In one aspect, embodiments described in the present disclosure are directed to a method of manufacturing a fibrous material wherein at least about 5% of all fibers within the fibrous material have either $R_xMg_2Al_{4+2x}Si_{5-x}O_{18}$ or $R_xMg_{2-x}Al_4Si_5O_{18}$ compositional structure. The method includes mixing at least two $R_xMg_2Al_{4+2x}Si_{5-x}O_{18}$ or $R_xMg_{2-x}Al_4Si_5O_{18}$ precursor materials to form a mixture (one or more of the at least two $R_xMg_2Al_{4+2x}Si_{5-x}O_{18}$ or $R_xMg_{2-x}Al_4Si_5O_{18}$ precursors being in the form of a fiber); extruding the mixture to create a fibrous body; and heat treating the fibrous body to form the fibrous material.

Embodiments of this aspect of the invention can include one or more of the following features. In some embodiments after heat treating the fibrous body at least about 25% of all fibers therein have one of the $R_xMg_2Al_{4+2x}Si_{5-x}O_{18}$ or $R_xMg_{2-x}Al_4Si_5O_{18}$ compositional structure. That is about 25% (e.g., 30%, 35%, 45%, 55%, 65% or more) of the precursor fibers reacted to form either $R_xMg_2Al_{4+2x}Si_{5-x}O_{18}$ or $R_xMg_{2-x}Al_4Si_5O_{18}$ fibers. In certain embodiments, one or more of the precursor materials can be selected from the group consisting of magnesia silica fibers, magnesium aluminate fibers, and alumina silicate fibers. The mixture can, in some embodiments, further include one or more additives selected from the group consisting of a fluid, a binder, and a pore former. The one or more additives can be substantially removed by heating the fibrous body.

In another aspect, embodiments described herein are directed to a method of manufacturing a fibrous body including $R_xMg_2Al_{4+2x}Si_{5-x}O_{18}$ or $R_xMg_{2-x}Al_4Si_5O_{18}$ fibers. The method includes mixing at least two $R_xMg_2Al_{4+2x}Si_{5-x}O_{18}$ or $R_xMg_{2-x}Al_4Si_5O_{18}$ precursor materials to form a mixture, wherein one or more of the at least two $R_xMg_2Al_{4+2x}Si_{5-x}O_{18}$ or $R_xMg_{2-x}Al_4Si_5O_{18}$ precursor materials is in the form of a fiber; reacting the at least two $R_xMg_2Al_{4+2x}Si_{5-x}O_{18}$ or $R_xMg_{2-x}Al_4Si_5O_{18}$ precursor materials to form a plurality of fibers within the mixture that have $R_xMg_2Al_{4+2x}Si_{5-x}O_{18}$ or $R_xMg_{2-x}Al_4Si_5O_{18}$ compositional structure; and shaping the mixture into the fibrous body, wherein at least about 5% of all fibers within the fibrous body have either the $R_xMg_2Al_{4+2x}Si_{5-x}O_{18}$ compositional structure or the $R_xMg_{2-x}Al_4Si_5O_{18}$ compositional structure.

Embodiments of this aspect of the invention can include one or more of the following features. In some embodiments at least about 25% of all fibers within the fibrous body after reacting the at least two $R_xMg_2Al_{4+2x}Si_{5-x}O_{18}$ or $R_xMg_{2-x}Al_4Si_5O_{18}$ precursor materials have the $R_xMg_2Al_{4+2x}Si_{5-x}O_{18}$ or $R_xMg_{2-x}Al_4Si_5O_{18}$ compositional structure. That is, at least 25% (e.g., 35%, 45%, 55%, 65%, 75%, 85%, 95%) of all the fibers within the fibrous body after the reaction of the precursors have either the $R_xMg_2Al_{4+2x}Si_{5-x}O_{18}$ compositional structure or $R_xMg_{2-x}Al_4Si_5O_{18}$ compositional structure. The fibers can be aligned such that at least about 20% of all of the fibers within the fibrous body are aligned in a common direction. In certain embodiments, one or more of the precursor materials can be selected from the group consisting of magnesia silica fibers, magnesium aluminate fibers, and alumina silicate fibers. The mixture can, in some embodiments, further include one or more additives selected from the group consisting of a fluid, a binder, and a pore former. The one or more additives can be substantially removed by heating the fibrous body.

In yet another aspect, embodiments of the invention are directed to a method of forming a porous honeycomb substrate. The method includes mixing at least two $R_xMg_2Al_{4+2x}Si_{5-x}O_{18}$ or $R_xMg_{2-x}Al_4Si_5O_{18}$ precursor materials to form a mixture, wherein one or more of the at least two $R_xMg_2Al_{4+2x}Si_{5-x}O_{18}$ or $R_xMg_{2-x}Al_4Si_5O_{18}$ precursor materials is in a form of a fiber; extruding the mixture to form a honeycomb substrate having a porosity of at least about 20%; and heat treating the honeycomb substrate to react the at least two $R_xMg_2Al_{4+2x}Si_{5-x}O_{18}$ or $R_xMg_{2-x}Al_4Si_5O_{18}$ precursor materials to form a plurality of fibers having $R_xMg_2Al_{4+2x}Si_{5-x}O_{18}$ or $R_xMg_{2-x}Al_4Si_5O_{18}$ compositional structure so that at least about 5% of all fibers within the honeycomb substrate have the $R_xMg_2Al_{4+2x}Si_{5-x}O_{18}$ or $R_xMg_{2-x}Al_4Si_5O_{18}$ compositional structure.

Embodiments of this aspect of the invention can include one or more of the following features. In some embodiments after heat treating the honeycomb substrate at least about 25% of all fibers therein have one of the $R_xMg_2Al_{4+2x}Si_{5-x}O_{18}$ or $R_xMg_{2-x}Al_4Si_5O_{18}$ compositional structure. The fibers can be aligned such that at least about 20% of all of the fibers within the fibrous body are aligned in a common direction. In certain embodiments, one or more of the precursor materials can be selected from the group consisting of magnesia silica fibers, magnesium aluminate fibers, and alumina silicate fibers. The mixture can, in some embodiments, further include one or more additives selected from the group consisting of a fluid, a binder, and a pore former. The one or more additives can be substantially removed by heating the fibrous body.

In another aspect, embodiments are directed to a $R_xMg_2Al_{4+2x}Si_{5-x}O_{18}$ or $R_xMg_{2-x}Al_4Si_5O_{18}$ fibrous honeycomb body. The fibrous honeycomb body including a honeycomb array of walls defining channels between adjacent walls. The walls include a plurality of $R_xMg_2Al_{4+2x}Si_{5-x}O_{18}$ or $R_xMg_{2-x}Al_4Si_5O_{18}$ fibers bonded to form a porous structure having an open network of pores. About 20% of the plurality of fibers within the walls are aligned in a common direction.

Embodiments of this aspect can include one or more of the following features. The walls within the fibrous honeycomb body can have a porosity of at least about 20% (e.g., 25%, 30%, 35%, 40%, 45%, 50%). In some embodiments, the plurality of $R_xMg_2Al_{4+2x}Si_{5-x}O_{18}$ or $R_xMg_{2-x}Al_4Si_5O_{18}$ fibers have an aspect ratio greater than about 1 and less than or equal to 2,000. In certain embodiments, a catalytic coating is disposed on the plurality of $R_xMg_2Al_{4+2x}Si_{5-x}O_{18}$ or $R_xMg_{2-x}Al_4Si_5O_{18}$ fibers.

In another aspect of the invention, embodiments are directed to a filter. The filter includes a housing including an inlet and an outlet. Disposed between the inlet and the outlet is a $R_xMg_2Al_{4+2x}Si_{5-x}O_{18}$ or $R_xMg_{2-x}Al_4Si_5O_{18}$ fibrous honeycomb body. The body includes a honeycomb array of walls defining channels between adjacent walls. The walls include a plurality of $R_xMg_2Al_{4+2x}Si_{5-x}O_{18}$ or $R_xMg_{2-x}Al_4Si_5O_{18}$ fibers bonded to form a porous structure having an open network of pores. In some embodiments the fibers within the walls are aligned in a common direction. In certain embodiments, at least one catalyst is deposited on the plurality of $R_xMg_2Al_{4+2x}Si_{5-x}O_{18}$ or $R_xMg_{2-x}Al_4Si_5O_{18}$ fibers.

BRIEF DESCRIPTION OF THE DRAWINGS

In the drawings, like reference characters generally refer to the same parts throughout the different views. Also, the drawings are not necessarily to scale, emphasis instead being placed upon illustrating the principles of the invention.

FIG. 5 is a schematic illustrated in a perspective view showing a honeycomb body.

FIG. 6 is a schematic illustrated in a perspective view showing multiple honeycomb bodies to be adjoined to form a larger body.

FIG. 7 is a cross-sectional schematic of a filter that includes a honeycomb body of FIG. 5.

DETAILED DESCRIPTION

In general, by reducing a ceramic material's CTE value, cracking due to thermal stresses can be minimized. The ceramic materials described below have a low CTE value. It is believed that the low CTE value is achieved by one or more of: (1) a substantial alignment of fibers within the material, (2) a manipulation of one or more of the lattice parameters through an adjustment in compositional structure of the ceramic material or (3) a combination of the alignment process of (1) and the manipulation of one or more of the lattice parameters as described in (2) above.

The ceramic materials described herein can be utilized in numerous applications, including but not limited to filters for diesel applications. In diesel automotive applications, using ceramic materials that have a high coefficient of thermal expansion within a catalytic filter can lead to poor or diminished performance and/or design flexibility. Specifically, diesel filters are prone to cracking during regeneration (i.e., a high temperature cycle used to burn out particulates trapped in the filter). Therefore, it would be advantageous to minimize the coefficient of thermal expansion of a ceramic material used in a diesel filter. In addition, performance of a diesel filter increases with an increased value for the thermal shock parameter (TSP). The thermal shock parameter is defined as follows: TSP=modulus of rupture (MOR) divided the product of Young's modulus and the coefficient of thermal expansion (CTE). As a result, a ceramic material having a low coefficient of thermal expansion will have greater performance.

Figure 1:
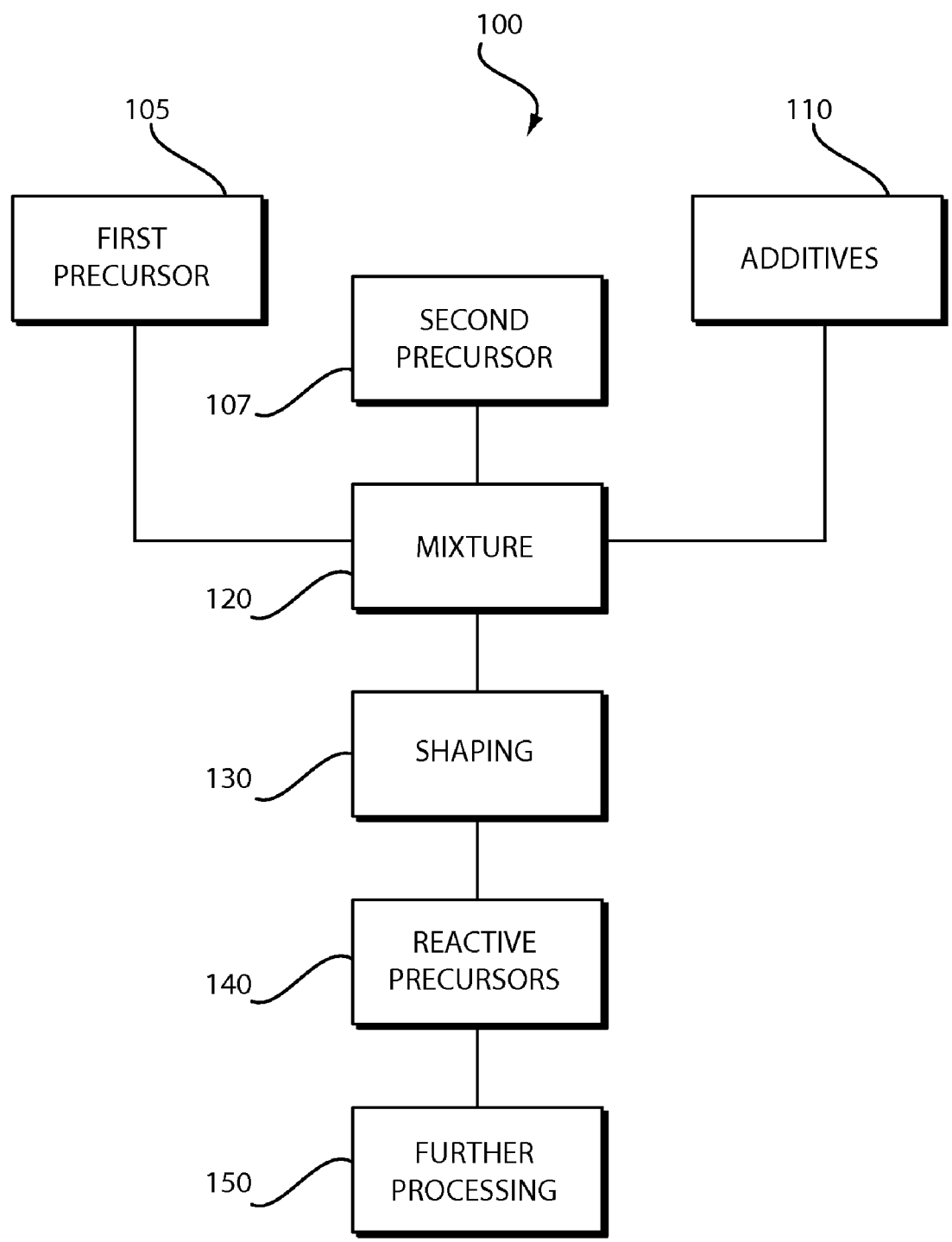
FIG. 1 is a flow chart illustrating a method of forming a fibrous material in accordance with an embodiment of the disclosure.

Referring to FIG. 1, a method 100 for manufacturing a fibrous ceramic material is illustrated. The fibrous ceramic material formed using this method has an ultimate or final structure (i.e., a structure after completion of the method shown in FIG. 1) in which at least about 5% of all fibers therein have either the $R_xMg_2Al_{4+2x}Si_{5-x}O_{18}$ or the $R_xMg_{2-x}Al_4Si_5O_{18}$ compositional structure. The fibers within the final structure are interlocking, so as to form a three dimensional porous structure in which fluids (e.g., gases) can pass therethrough. The method includes mixing at least two $R_xMg_2Al_{4+2x}Si_{5-x}O_{18}$ or $R_xMg_{2-x}Al_4Si_5O_{18}$ precursor materials, such as a first precursor 105 and a second precursor 107 to form a mixture 120. (While FIG. 1, shows two precursors, any number of precursors greater than or equal to two can be utilized.) A $R_xMg_2Al_{4+2x}Si_{5-x}O_{18}$ or $R_xMg_{2-x}Al_4Si_5O_{18}$ precursor is a material that when reacted with other materials forms a portion of the $R_xMg_2Al_{4+2x}Si_{5-x}O_{18}$ or the $R_xMg_{2-x}Al_4Si_5O_{18}$ compositional structure, respectively. For example, a possible $R_xMg_2Al_{4+2x}Si_{5-x}O_{18}$ precursor is Veegum clay (i.e., a clay that includes MgO, SiO, and $Al_2O_3$); another possible precursor is $Al_2O_3$ powder; another possible precursor is a sol of any material including Mg, Al, and/or Si; still yet another precursor is GeO where R in $R_xMg_2Al_{4+2x}Si_{5-x}O_{18}$ represents Ge. (The above $R_xMg_2Al_{4+2x}Si_{5-x}O_{18}$ precursors are also $R_xMg_{2-x}Al_4Si_5O_{18}$ precursors.)

Precursors 105 and 107 can come in a number of forms. For example, the precursors can be fiber based, colloidal based, particle/powder based, or liquid solution based. However, one or more of the at least two $R_xMg_2Al_{4+2x}Si_{5-x}O_{18}$ or $R_xMg_{2-x}Al_4Si_5O_{18}$ precursors (i.e., 105 and 107) is in the form of a fiber so that mixture 120 is a fiber based material. That is, at least one of precursor 105 and precursor 107 is in the form of a fiber, such as, for example, alumina fibers, silica fibers, mullite fibers, alumina silicate fibers (e.g., $Al_2O_3SiO_2$ fibers, mullite fibers, cordierite fibers), magnesium aluminate fibers, or magnesia silica fibers.

Optionally, additives 110, such as, for example binders, rheology modifiers (e.g., fluids), and pore formers can be introduced into mixture 120. These additives 110 can be used to modify or manipulate the consistency of mixture 120 so as to aid in later form shaping processes. In addition, these additives 110 can be used as pore place holders. That is, these additives are inert with respect to the $R_xMg_2Al_{4+2x}Si_{5-x}O_{18}$ or $R_xMg_{2-x}Al_4Si_5O_{18}$ precursors and can be removed from the mixture 120 after the form shaping processes, thereby allowing for increased porosity in the ultimate form.

Figure 2:
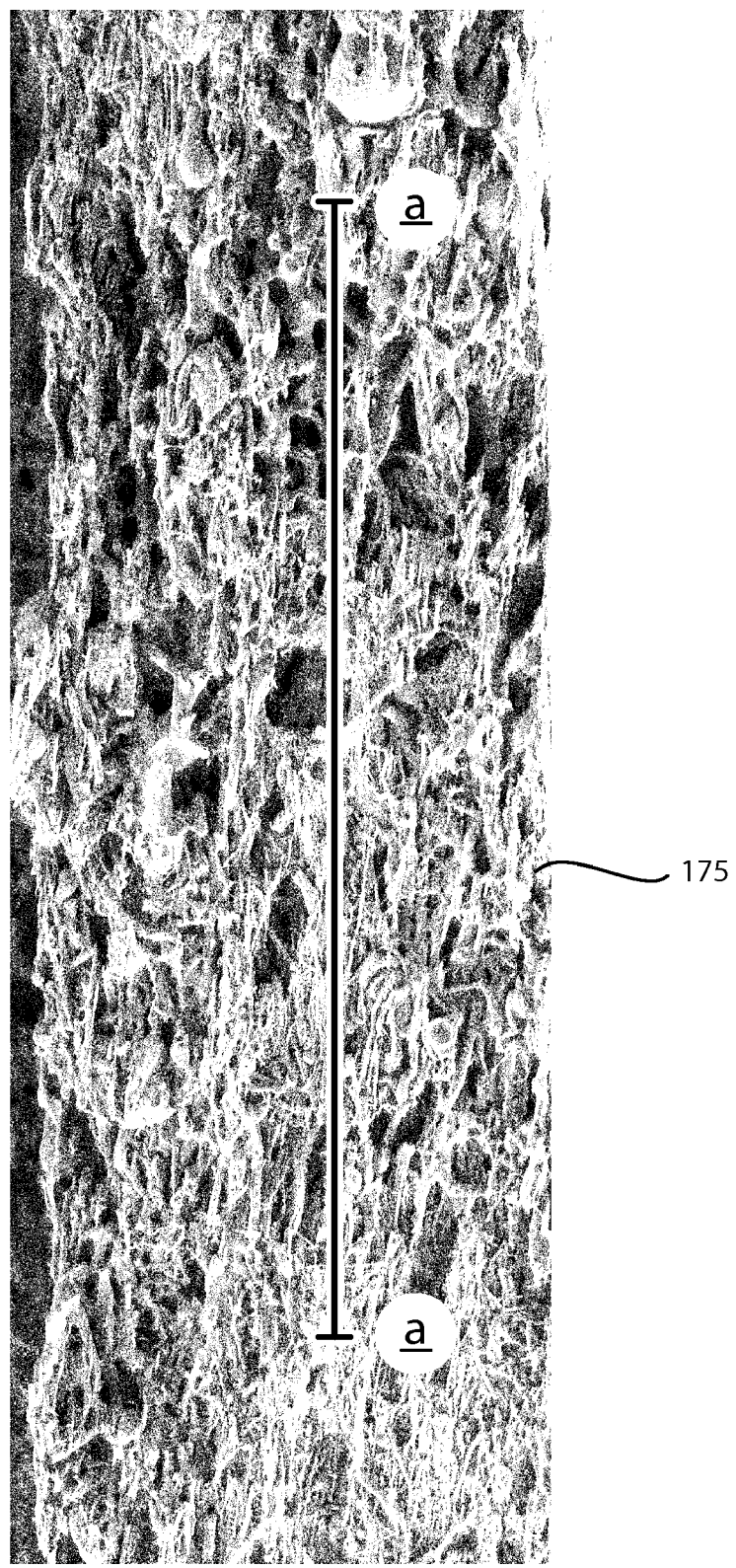
FIG. 2 is a micrograph a portion of a fibrous material formed in accordance with the method of FIG. 1.

After the $R_xMg_2Al_{4+x}Si_{5-x}O_{18}$ or $R_xMg_{2-x}Al_4Si_5O_{18}$ precursors (i.e., 105 and 107) with any optional additives 110 are mixed and homogenized, the mixture 120 is shaped 130 into a form. In one embodiment, shaping 130 can occur by extrusion of the mixture 120. Without wishing to be bound by theory, it is believed that extrusion of a fibrous mixture, such as mixture 120, results in the substantial alignment of fibers. For example, it is believed that at least about 20% of the fibers within a fibrous mixture are substantially aligned in a common direction after extrusion. FIG. 2 shows an extruded fibrous structure 175 in which an average of 80% of all fibers within the form are aligned along line a-a shown therein. Shear forces that act upon the mixture during extrusion tend to orient the fibers in the direction of extrusion. It will be appreciated that extrusion designs, mixture rheologies, and fiber content and fiber rigidity can influence the orientation behavior of the extruded mixture.

Other shaping processes 130, other than extrusion, can also be utilized to create the form. Examples of other shaping processes include molding, such as injection molding, and casting. In these shaping processes, fiber alignment may occur to a lesser degree than with extrusion.

Figure 3A:
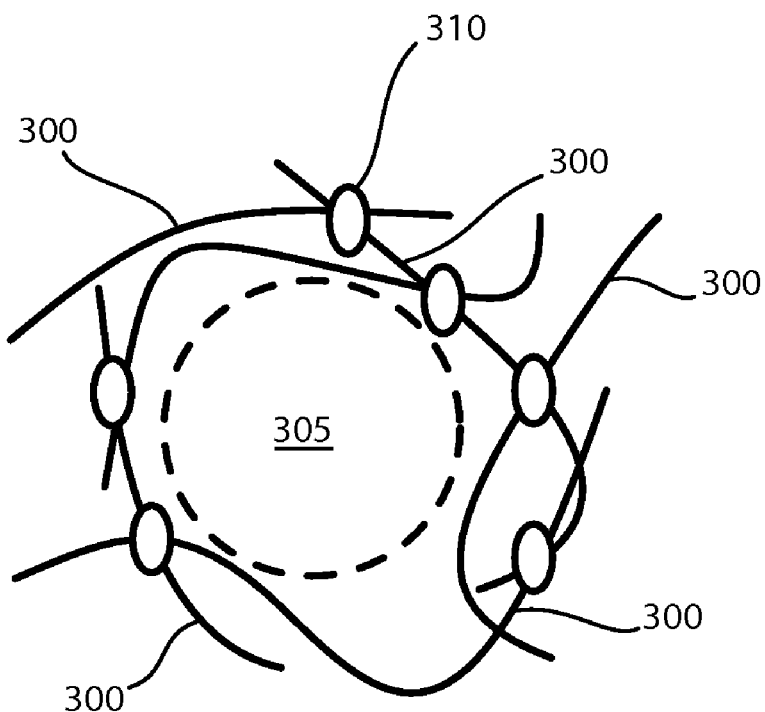
FIGS. 3A and 3B are cross-sectional schematics illustrating the presence and the absence of pore formers and binders prior to and after a heat treatment, respectively.
Figure 3B:
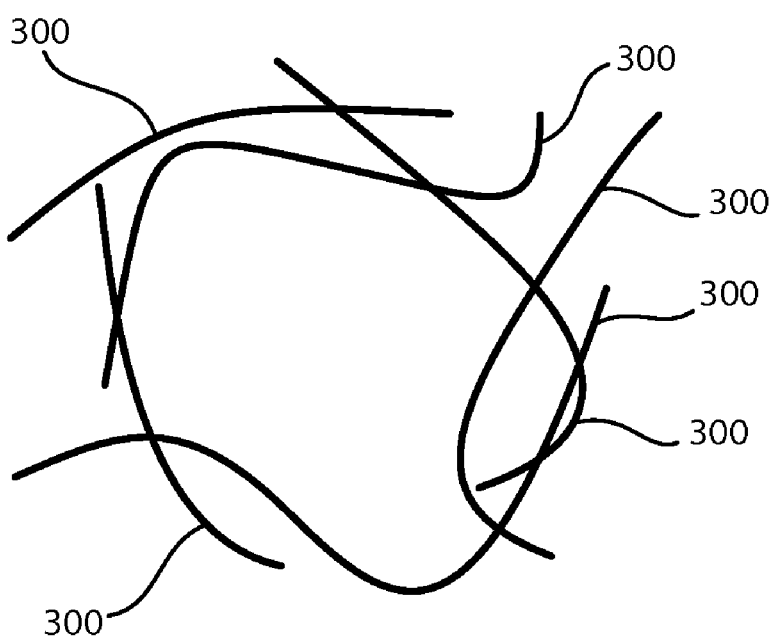

Once shaped, energy is applied to the form to initiate a reaction 140 between the precursors 105 and 107. For example, the form can be fired at a temperature of less than about 1,420° C. for several hours to cause a reaction between the two or more $R_xMg_2Al_{4+2x}Si_{5-x}O_{18}$ precursors or two or more $R_xMg_{2-x}Al_4Si_5O_{18}$ precursors. As a result of this reaction, at least 5% of all fibers within the form are transformed into either $R_xMg_2Al_{4+2x}Si_{5-x}O_{18}$ or $R_xMg_{2-x}Al_4Si_5O_{18}$ fibers. For example, if the $R_xMg_2Al_{4+2x}Si_{5-x}O_{18}$ precursors included mullite fibers, $MgCO_3$ particles, and $GeO_2$ particles, under the influence of heat, 5% or more of the fibers therein are transformed to have the following compositional structure: $Ge_xMg_2Al_{4+2x}Si_{5-x}O_{18}$ (where x will be dependent on the relative ratios of the precursors used). The application of energy (e.g., heat) also allows for the creation of bonds between the fibers. As heat is applied (e.g., directly in the case of a furnace or inductively as when an RF source is utilized), water and other additives are eliminated or reduced resulting in fiber-to-fiber contact. (See FIGS. 3A and 3B showing fiber 300 interactions as a result of the presence and the removal of pore formers 305 and binders 310, respectively). It will be appreciated that the bonds may be formed in several ways at these fiber-to-fiber contact sites. For example, a number of types of sintering mechanism can be utilized, including but not limited to liquid assisted sintering, solid state sintering, and reaction-phase sintering wherein a chemical reaction occurs at the fiber-to-fiber contact site. As a result of fiber bond formation, the ceramic material formed utilizing method 100 is a fibrous material having interlocked fibers, wherein at least 5% of all fibers have the either $R_xMg_2Al_{4+2x}Si_{5-x}O_{18}$ or $R_xMg_{2-x}Al_4Si_5O_{18}$ compositional structure.

As an optional step, the fibrous form can be further processed as shown in step 150 in FIG. 1. Further processing steps include: (a) additional heat treatments to create further bonds between fibers or to remove additives such as pore formers, organic binders, and fluids, such as water (b) application of coatings, such as, for example catalytic coatings on the fibers, (c) introduction of increased porosity or creation of directed flow channels via mechanical processing (e.g., drilling or capping/filling passageways), and (d) incorporating the fibrous material into a filter or other apparatus.

Figure 4:
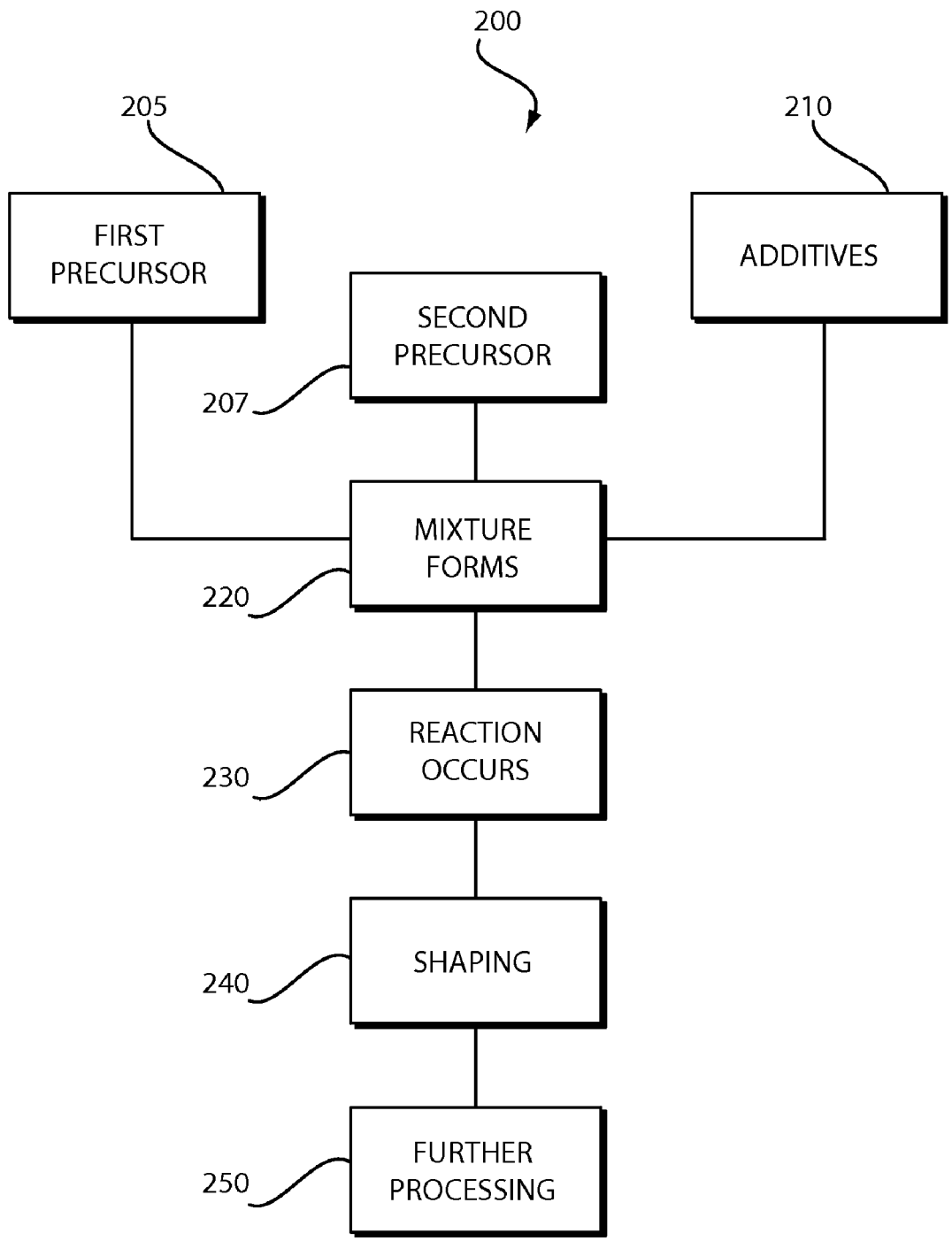
FIG. 4 is a flow chart illustrating another method of forming a fibrous material in accordance with an embodiment of the disclosure.

In another embodiment, shown in FIG. 4, a method 200 of forming a fibrous body includes mixing at least two $R_xMg_2Al_{4+2x}Si_{5-x}O_{18}$ precursors or $R_xMg_{2-x}Al_4Si_5O_{18}$ precursors (205 and 207) together with any optional additives 210 to form a mixture 220. One or more of the at least two $R_xMg_2Al_{4+2x}Si_{5-x}O_{18}$ or $R_xMg_{2-x}Al_4Si_5O_{18}$ precursors 205 and 207 is in fiber form. Energy, such as heat or light, is applied to the mixture to initiate a reaction 230 between the two or more $R_xMg_2Al_{4+2x}Si_{5-x}O_{18}$ or $R_xMg_{2-x}Al_4Si_5O_{18}$ precursors. The optional additives 210 are inert with respect to the precursors 205 and 207, and as a result do not participate in the reaction. The reacted mixture 230 is then shaped 240 into the fibrous body through extrusion, molding, or other shaping technique. Optional processing steps 250, such as, for example, heat treating the fibrous body to remove or reduce the amount of optional additives 210, sintering the fibrous body to create bonds between fibers, introducing further porosity or directed flow channels into the fibrous body, depositing coatings, and/or incorporating the fibrous material into a filter or other apparatus can be performed after the fibrous body is shaped 240.

The $R_xMg_2Al_{4+2x}Si_{5-x}O_{18}$ or $R_xMg_{2-x}Al_4Si_5O_{18}$ precursors utilized in methods 100 and 200 can be supplied in various forms. As discussed above, one or more of the at least two $R_xMg_2Al_{4+2x}Si_{5-x}O_{18}$ or $R_xMg_{2-x}Al_4Si_5O_{18}$ precursors is in the form of a fiber so that any resulting mixture of the precursors is a fiber based material. An illustrative list of $R_xMg_2Al_{4+2x}Si_{5-x}O_{18}$ or $R_xMg_{2-x}Al_4Si_5O_{18}$ precursors in fiber form includes, but is not limited to: alumina silicate fibers, such as for example, mullite fibers, aluminosilicate H95C fibers, strontium aluminum silicate fibers, lithium aluminum silicate fibers, and aluminoborosilicate fibers, magnesium silicate fibers, such as, for example Isofrax fibers (a biosoluble fiber available from ISOFRAX, Niagara Falls, N.Y.), magnesium strontium silicate fibers, and magnesium calcium strontium silicate fibers, $Al_2O_3$ fiber, SiO fibers, MgO fibers, $Li_2O$ fibers, where R is Li, and $SrCO_3$ fibers where R is Sr. In general, these fibers have an aspect ratio (i.e., the ratio of the length of the fiber divided by the diameter of the fiber) greater than one. As used herein, the "diameter" of the fiber assumes for simplicity that the sectional shape of the fiber is a circle; this simplifying assumption is applied to fibers regardless of their true section shape (e.g., square, triangular, etc.) In certain embodiments, the fibers have an aspect ratio that is less than or equal to 2,000. That is, in certain embodiments, the fibers have a diameter in the micron or submicron range (e.g., 1 micron) while the length of the fibers is a few millimeters (e.g., 2 millimeters). In general, the fibers can have a diameter ranging from about 100 nm to about 100 microns. However, in certain embodiments, the fibers have a diameter within the range of about 100 nm to about 10 microns and in some embodiments, the fibers have a diameter within the range of about 2 microns to about 10 microns.

The at least two $R_xMg_2Al_{4+2x}Si_{5-x}O_{18}$ or $R_xMg_{2-x}Al_4Si_5O_{18}$ precursors can be all in fiber form or alternatively, the precursors can be any combination of fibers and some other form. Other $R_xMg_2Al_{4+2x}Si_{5-x}O_{18}$ or $R_xMg_{2-x}Al_4Si_5O_{18}$ precursors, which are not in fiber form, include but are not limited to: $MgCO_3$ particles, colloidal silica, silica particles, $Al_2O_3$ particles, sols of any material including Mg, Al, or Si, Veegum clays, talcs, or particles, $SrCO_3$ particles where R is Sr, $GeO_2$ particles where R is Ge, $K_2O$ particles where R is K, LiO where R is Li, and MnO particles where R in Mn. The above list of precursors is for illustrative purposes only and is by no means exhaustive. That is, any precursor material that when reacted with other constituents forms a portion of a $R_xMg_2Al_{4+2x}Si_{5-x}O_{18}$ or $R_xMg_{2-x}Al_4Si_5O_{18}$ fiber can be utilized in methods 100 and 200.

The specific $R_xMg_2Al_{4+2x}Si_{5-x}O_{18}$ precursors or $R_xMg_{2-x}Al_4Si_5O_{18}$ precursors and precursor amounts utilized are selected in accordance with a target fiber chemistry and crystal structure. That is, the amount and type of precursor 105/205 and the amount and type of precursors 107/207 are selected based on the target fiber chemistry and crystal structure. For example, if a targeted fiber chemistry is $Ca_xMg_2Al_{4+2x}Si_{5-x}O_{18}$ having a cordierite type crystal structure (i.e., orthorhombic crystal structure), then the following four $R_xMg_2Al_{4+2x}Si_{5-x}O_{18}$ precursors having the following weight percents could be used: 71.2% aluminosilicate fiber: 21.9% Isofrax fiber:5.3% $MgCO_3$ particles:1.5% $CaCO_3$ particles. Similarly if the same target fiber chemistry (i.e., $Ca_xMg_2Al_{4+2x}Si_{5-x}O_{18}$) is desired but instead of an orthorhombic crystal structure a triclinic or anorthite crystal structure is desired, then the following weigh percents of the precursors can be utilized: 62% aluminosilicate fiber:18% Isofrax fiber:6.9% $MgCO_3$ particles:12.5% $CaCO_3$ particles. By lowering the amount of Al but increasing the amount of Ca available during the reaction, a different crystal structure forms and thus different lattice parameters and associated properties are achieved. As a result, the fiber chemistry and crystal structure can be tailored to achieve optimum properties for a specific application.

In addition to determining the crystal structure of the resulting fiber, the relative amounts of the at least two precursors also affects the amount of precursor fibers that participate in reaction 140/230. In order for all or substantially all of the precursor material to participate in the reaction 140/230 the relative amounts of the precursors should be substantially equal to their solubility limits for a particular solid solution having a particular crystal structure. If the relative amounts vary from the solubility limit but are still within a range therein to form a particular crystal structure, then the reaction can be limited due to a shortage of one or more elements. As a result, not all of the precursor fibers will participate in the reaction and thus some precursor fibers will remain in the fibrous body after reaction 140/230 has taken place. Accordingly, the fibrous body can include less than 100% $R_xMg_2Al_{4+2x}Si_{5-x}O_{18}$ or $R_xMg_{2-x}Al_4Si_5O_{18}$ fibers. For example, about 45% of the fibers within a fibrous body are transformed to $Ca_xMg_2Al_{4+2x}Si_{5-x}O_{18}$ fibers when a ratio of 76.8% mullite fibers:6.2% Isofrax fibers: 17% bentonite clay is mixed together; whereas about 10% of the fibers within a fibrous body are transformed to $Ca_xMg_2Al_{4+2x}Si_{5-x}O_{18}$ fibers when a ratio of 91% mullite fibers:3.8% Isofrax fibers:5.1% bentonite clay is used.

With the ability to control fiber chemistry and crystal structure, the fibrous material can be tailored to provide a low CTE value. For example, cordierite, $Mg_2Al_4Si_5O_{18}$, is known to have a relatively low average CTE value ($1\times10-6/°$ C.). However, by modifying cordierite's chemistry ($R_xMg_2Al_{4+2x}Si_{5-x}O_{18}$ or $R_xMg_{2-x}Al_4Si_5O_{18}$) and crystal structure, lower CTE values, especially in a particular lattice direction can be achieved. Moreover, by providing fiber alignment within the fibrous material, further tailoring of the material's CTE value can be achieved.

The fibrous materials resulting from methods 100 and 200 can be shaped into porous honeycomb substrates or bodies, which can be utilized as filters and in particular, filters for automotive applications.

Referring to FIG. 5, a porous honeycomb body 510 is shown. The honeycomb body 510 has an array of walls 515 that define channels 520 between adjacent walls 515. The walls 515 comprise the fibrous material described above. That is, the walls 515 include a plurality of either $R_xMg_2Al_{4+2x}Si_{5-x}O_{18}$ or $R_xMg_{2-x}Al_4Si_5O_{18}$ fibers bonded to form a porous structure. The porous structure has at least 20% porosity and typically has an open-network of pores so that fluids can flow through the structure. At least 20% of the $R_xMg_2Al_{4+2x}Si_{5-x}O_{18}$ or $R_xMg_{2-x}Al_4Si_5O_{18}$ fibers within the walls 515 are aligned. As a result, material properties, such as the coefficient of thermal expansion, which have directional values, can be manipulated to provide a lower value in a particular direction. That is, the fibers can be aligned along a particular lattice direction, such as the lattice parameter (a, b, or c) which has the lowest CTE value. For example, if a particular material has the lowest CTE along the c direction, then the fibers can be extruded or otherwise shaped such that at least 20% (e.g., 25%, 30%, 40%, 50%, 60%, 70%, 80%, 90%) of the fibers are substantially aligned along the c direction. The walls of the honeycomb body 510 can then be formed such that the c direction of the aligned fibers falls within the plane of the walls 515. As a result, the walls will experience the least amount of expansion when exposed to heat. Similarly, the fibers in the material can be aligned such that 20% or more (e.g., 25%, 30%, 40%, 50%, 60%, 70%, 80%) of the fibers are aligned along a direction that has the highest CTE value. In this embodiment, the walls 515 of the honeycomb body 510 are formed such that the aligned fibers form the smallest dimension (i.e., depth) of the walls 515 so that the area greatest affected by heat is positioned to have the least structural effect.

The honeycomb body 510 can be fabricated in any number of shapes such as, for example, a cylinder (shown in FIG. 5), a pie-shaped wedge or subcylindrical section, a rectangle (as shown in FIG. 6), or a diamond. These honeycomb bodies 510 can be glued together to form a segmented body as shown in FIG. 6. As a result of gluing the bodies together, any size, shape, or dimension honeycomb form can be generated. With a low coefficient of thermal expansion porous fibrous material, it is possible to extrude or otherwise form shapes (e.g., cylinders) with large widths (e.g., diameters between 5.66 inches and 14 inches) without utilizing a low Young's modulus glue/adhesive to adjoin smaller segments to form a larger form. The ability to extrude or form larger widths provides flexibility in production techniques and potential cost reduction in volume production.

FIG. 7 depicts a cross-sectional representation of a filter 700 utilizing the porous honeycomb body 510 of FIG. 5. The filter 700 includes a housing 720, which surrounds the porous honeycomb body 510. The housing includes an inlet 705 and an outlet 707 through which gasses, such as exhaust gasses, travel through. Between the housing 720 and the honeycomb body 510 is a mat 730 that supports and forms an air-tight seal between the housing 720 and the honeycomb body 510. The honeycomb body 510 is configured in a wall-flow configuration by selectively plugging alternate channels, with outlet blocks 760 and inlet blocks 770 to form a plurality of respective inlet channels 740 and outlet channels 750. In this embodiment, the open network of pores within the walls 515 provides sufficient porosity and permeability to permit flow through the walls 515 between the inlet and outlet channels 740, 750. As a result, particulate matter can be accumulated on the surface of the inlet channel walls 740, and be removed from the gas stream by means of the filter 700. Coatings, such as, catalytic coatings or other reactive coatings, can be deposited along the walls 515 to increase the concentration of particles captured by the walls 515. For example, for a filter used in a diesel automotive environment, the walls 515 can be coated with a catalytic coating that facilitates oxidation of accumulated soot and accelerates the conversion of exhaust gas into less-harmful constituents. Techniques for applying catalytic and other types of coatings to substrates and porous bodies are well known in the field of art.

Figure 8:
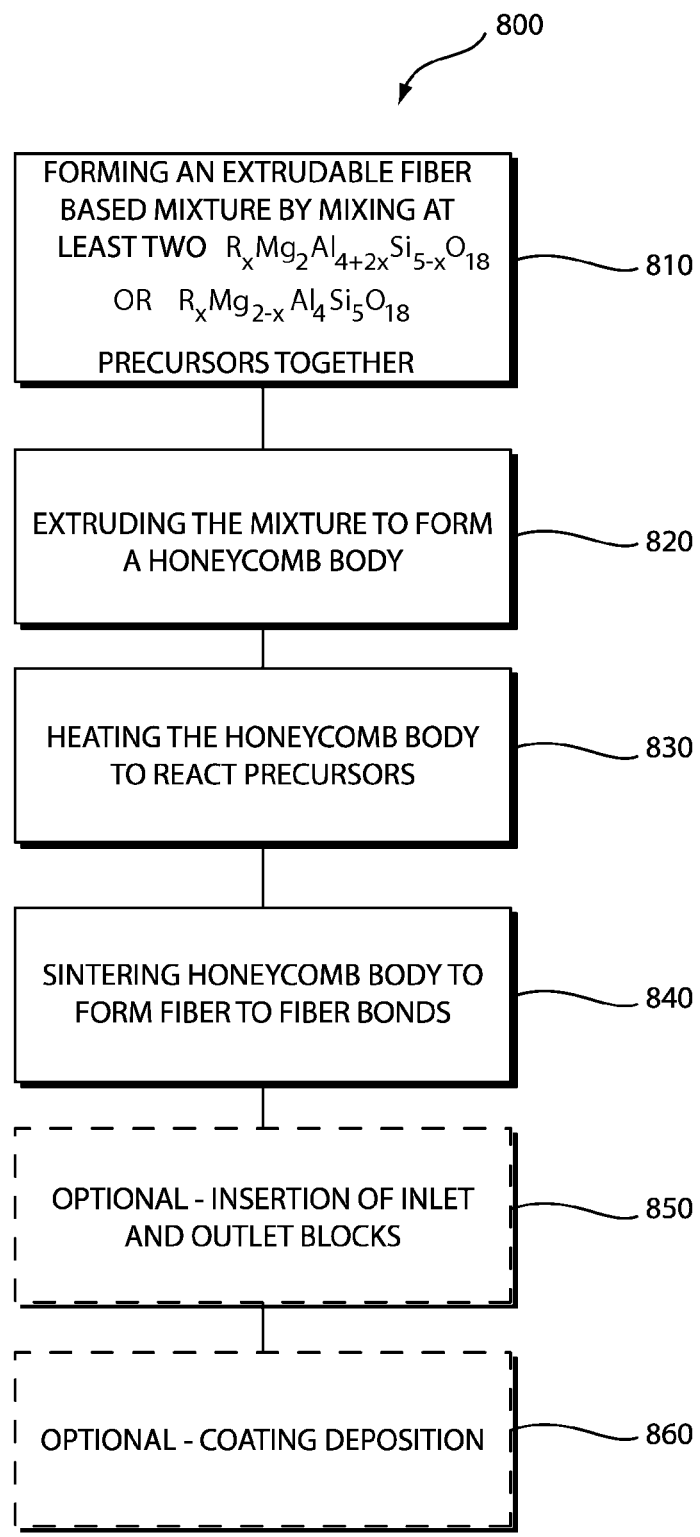
FIG. 8 is a schematic illustrating a method of forming a honeycomb body in accordance with an embodiment of the disclosure.

FIG. 8 illustrates a method of forming a honeycomb body, such as honeycomb body 510 of FIG. 5. First, as shown in step 810, at least two $R_xMg_2Al_{4+2x}Si_{5-x}O_{18}$ or $RxMg_{2-x}Al_4Si_5O_{18}$ precursors wherein one or more of the precursors is in fiber form are mixed together to form a mixture. Fluid, pore formers, and/or rheology agents such as binders can also be added to the mixture to enable efficient extrusion or shaping of the mixture. After obtaining a desired consistency, the mixture is extruded into a honeycomb body having at least 20% porosity (step 820) and then heated to react the at least two $R_xMg_2Al_{4+2x}Si_{5-x}O_{18}$ $RxMg_{2-x}Al_4Si_5O_{18}$ precursors and to substantially eliminate or remove the optional additives (i.e., fluids, pore formers, and binders (step 830)). At least 5% of all of the fibers within the honeycomb body are transformed to have either the $R_xMg_2Al_{4+2x}Si_{5-x}O_{18}$ or $RxMg_{2-x}Al_4Si_5O_{18}$ compositional structure. Bonds between fibers (i.e., between the fibers formed from the precursors in step 830 and any unreacted fibers) are formed via sintering 840 the honeycomb body. In some embodiments, steps 830 and 840 occur during one heat treatment process. In other embodiments, multiple heat treating processes are utilized to react the $R_xMg_2Al_{4+2x}Si_{5-x}O_{18}$ or $RxMg_{2-x}Al_4Si_5O_{18}$ precursors, to substantially eliminate optional additives, and to sinter fibers. In embodiments where the honeycomb body is a filter, inlet and outlet blocks (e.g., 740, 750 in FIG. 7) are inserted to create a flow path through the filter (optional step 850). In addition, a catalytic coating can be applied to the filter to provide the filter with reactive functionality in its intended application, such as, for example, to promote oxidation of captured soot in a diesel particulate filter (optional step 860).

Variations, modifications, and other implementations of what is described herein will occur to those of ordinary skill in the art without departing from the spirit and scope of the invention. For example, while an number of embodiments have been described in which the fibrous material has been utilized as a filter, especially a filter for diesel applications, the fibrous material can be used in any application where a low coefficient of thermal expansion ceramic material would be desired, such as for example, in the aerospace industry, liquid filtration, cross flow filtration, molten metal filtration, fixed bed chemical reactors, honeycomb high surface area adsorbents, and high temperature reactors.

EXAMPLES

The following examples are provided to further illustrate and to facilitate the understanding of the disclosure. These specific examples are intended to be illustrative of the disclosure and are not intended to be limiting.

In a first illustrative example in which the target fiber chemistry is $Ca_xMg_2Al_{4+x}Si_{5-x}O_{18}$ (where x=0.1) with an orthorhombic crystal structure, the following precursors are mixed together: 71.2 grams of mullite fibers, 21.9 grams of Isofrax fibers, 5.3 grams of $MgCO_3$ particles, and 1.5 grams of $CaCO_3$. The following additives are also added to form an extrudable mixture: 16 grams of hydroxypropyl methylcellulose (an organic binder and rheology modifier), 65 grams of carbon particles (~45 micron mesh grade and utilized as a pore former), and 130 grams of deionized water as a mixing fluid. The materials are mixed into the extrudable mixture and formed into 1" diameter honeycomb substrates by extrusion. The substrates are dried using a radio-frequency (RF) drying facility, followed by a sintering operation at 1,300° C. for two hours to form a porous honeycomb structure having about 88% porosity. More than 80% of all of the mullite fibers and Isofrax fibers utilized in the extrudable mixture reacted to form $Ca_{0.1}Mg_2Al_{4.1}Si_{4.9}O_{18}$ fibers having an orthorhombic crystal structure. In this embodiment, the coefficient of thermal expansion of the porous ceramic body is $0.8 \times 10-6/°$ C. and the fibers are observed to be approximately 70-80% aligned in the extrusion direction.

In a second illustrative in which the target fiber chemistry is $Ca_xMg_2Al_{4+x}Si_{5-x}O_{18}$ (where x=1.0) with a triclinic crystal structure, the following precursors are mixed together: 62 grams of mullite fibers, 18.6 grams of Isofrax fibers, 6.9 grams of $MgCO_3$ particles, and 12.5 grams of $CaCO_3$. The following additives are also added to form an extrudable mixture: 16 grams of hydroxypropyl methylcellulose, 65 grams of carbon particles (~45 micron mesh grade), and 130 grams of deionized water. The materials are mixed into the extrudable mixture and formed into 1" diameter honeycomb substrates by extrusion. The substrates are dried using a radio-frequency (RF) drying facility, followed by a sintering operation at 1,300° C. for two hours to form a porous honeycomb structure having about 89% porosity. More than 80% of all of the mullite fibers and Isofrax fibers utilized in the extrudable mixture reacted to form $Ca_1Mg_2Al_3Si_4O_{18}$ fibers having a triclinic crystal structure. In this embodiment, the coefficient of thermal expansion of the porous ceramic body is $0.7 \times 10-6/°$ C. and the fibers are observed to be approximately 70-80% aligned in the extrusion direction.

In a third illustrative example in which the target fiber chemistry is $Ca_xMg_2Al_{4+x}Si_{5-x}O_{18}$ (where x=0.1) with an orthorhombic crystal structure, the following precursors are mixed together: 96 grams of mullite fibers, 2.0 grams of Isofrax fibers, 2.0 grams of $MgCO_3$ particles, and 0.6 grams of $CaCO_3$. The following additives are also added to form an extrudable mixture: 16 grams of hydroxypropyl methylcellulose, 20 grams of carbon particles (~45 micron mesh grade), and 70 grams of deionized water. The materials are mixed into the extrudable mixture and formed into 1" diameter honeycomb substrates by extrusion. The substrates are dried using a radio-frequency (RF) drying facility, followed by a sintering operation at 1,300° C. for two hours to form a porous honeycomb structure having about 77% porosity. Approximately 10% of all of the mullite fibers and Isofrax fibers utilized in the extrudable mixture reacted to form $Ca_{0.1}Mg_2Al_{4.1}Si_{4.9}O_{18}$ fibers having an orthorhombic crystal structure. In this embodiment, the coefficient of thermal expansion of the porous ceramic body is $3.2 \times 10-6/°$ C.

In a third illustrative example in which the target fiber chemistry is $Ca_xMg_2Al_{4+x}Si_{5-x}O_{18}$ (where x=0.1) with an orthorhombic crystal structure, the following precursors are mixed together: 161.8 grams of mullite fibers, 13 grams of Isofrax fibers, and 35.9 grams of bentonite clay. The following additives are also added to form an extrudable mixture: 16 grams of hydroxypropyl methylcellulose, 65 grams of carbon particles (−45 micron mesh grade), and 130 grams of deionized water. The materials are mixed into the extrudable mixture and formed into 1" diameter honeycomb substrates by extrusion. The substrates are dried using a radio-frequency (RF) drying facility, followed by a sintering operation at 1,300° C. for two hours to form a porous honeycomb structure having about 75% porosity. Approximately, 45% of all of the mullite fibers and Isofrax fibers utilized in the extrudable mixture reacted to form $Ca_{0.1}Mg_2Al_{4.1}Si_{4.9}O_{18}$ fibers having an orthorhombic crystal structure. In this embodiment, the coefficient of thermal expansion of the porous ceramic body is $0.7 \times 10-6/°$ C.

In a fourth illustrative example in which the target fiber chemistry is $Ca_xMg_2Al_{4+x}Si_{5-x}O_{18}$ (where x=0.1) with an orthorhombic crystal structure, the following precursors are mixed together: 53.2 grams of mullite fibers, 2.2 grams of Isofrax fibers, and 3 grams of bentonite clay. The following additives are also added to form an extrudable mixture: 16 grams of hydroxypropyl methylcellulose, 65 grams of carbon particles (−45 micron mesh grade), and 60 grams of deionized water. The materials are mixed into the extrudable mixture and formed into 1" diameter honeycomb substrates by extrusion. The substrates are dried using a radio-frequency (RF) drying facility, followed by a sintering operation at 1,300° C. for two hours to form a porous honeycomb structure having about 86% porosity. Approximately, 10% of all of the mullite fibers and Isofrax fibers utilized in the extrudable mixture reacted to form $Ca_{0.1}Mg_2Al_{4.1}Si_{4.9}O_{18}$ fibers having an orthorhombic crystal structure. In this embodiment, the coefficient of thermal expansion of the porous ceramic body is $3.1 \times 10-6/°$ C.

In a fifth illustrative example in which the target fiber chemistry is $Ge_{0.8}Mg_2Al_{4.8}Si_{4.2}O_{18}$ with an orthorhombic crystal structure, the following precursors are mixed together: 59.8 grams of alumina silicate fibers, 6 grams of Isofrax fibers, and 11.1 grams of $GeO_2$ particles. The following additives are also added to form an extrudable mixture: 16 grams of hydroxypropyl methylcellulose, 20 grams of carbon particles (−45 micron mesh grade), 23.2 grams of $MgCO_3$ as binder, and 130 grams of deionized water as a mixing fluid. The materials are mixed into the extrudable mixture and formed into 1" diameter honeycomb substrates by extrusion. The substrates are dried using a radio-frequency (RF) drying facility, followed by a sintering operation at 1,300° C. for two hours to form a porous honeycomb structure having about 85% porosity. More than 80% of all of the alumina silicate fibers and Isofrax fibers utilized in the extrudable mixture reacted to form $Ge_{0.8}Mg_2Al_{4.8}Si_{4.2}O_{18}$ fibers having an orthorhombic crystal structure. In this embodiment, the coefficient of thermal expansion of the porous ceramic body is $0.7 \times 10-6/°$ C.

In a sixth illustrative example in which the target fiber chemistry is $Mn_1Mg_1Al_4Si_5O_{18}$ with an orthorhombic crystal structure, the following precursors are mixed together: 63.8 grams of alumina silicate fibers, 19.8 grams of Isofrax fibers, and 11.9 grams of MnO particles. The following additives are also added to form an extrudable mixture: 16 grams of hydroxypropyl methylcellulose, 20 grams of carbon particles (−45 micron mesh grade), 4.6 grams of $MgCO_3$ as binder, and 70 grams of deionized water as a mixing fluid. The materials are mixed into the extrudable mixture and formed into 1" diameter honeycomb substrates by extrusion. The substrates are dried using a radio-frequency (RF) drying facility, followed by a sintering operation at 1,300° C. for two hours to form a porous honeycomb structure having about 82% porosity. More than 80% of all of the alumina silicate fibers and Isofrax fibers utilized in the extrudable mixture reacted to form $Mn_1Mg_1Al_4Si_5O_{18}$ fibers having an orthorhombic crystal structure. In this embodiment, the coefficient of thermal expansion of the porous ceramic body is $0.6 \times 10-6/°$ C.

In a seventh illustrative example in which the target fiber chemistry is $K_{0.5}Mg_2Al_{4.5}Si_{4.5}O_{18}$ with an orthorhombic crystal structure, the following precursors are mixed together: 71.2 grams of alumina silicate fibers, 2.3 grams of Isofrax fibers, and 1.2 grams of $K_2O$ particles. The following additives are also added to form an extrudable mixture: 16 grams of hydroxypropyl methylcellulose, 20 grams of carbon particles (−45 micron mesh grade), 25 grams of $MgCO_3$ as binder, and 70 grams of deionized water as a mixing fluid. The materials are mixed into the extrudable mixture and formed into 1" diameter honeycomb substrates by extrusion. The substrates are dried using a radio- frequency (RF) drying facility, followed by a sintering operation at 1,300° C. for two hours to form a porous honeycomb structure having about 86% porosity. More than 80% of all of the alumina silicate fibers and Isofrax fibers utilized in the extrudable mixture reacted to form $K_{0.5}Mg_2Al_{4.5}Si_{4.5}O_{18}$ fibers having an orthorhombic crystal structure. In this embodiment, the coefficient of thermal expansion of the porous ceramic body is $0.8 \times 10-6/°$ C.

In an eight illustrative example in which the target fiber chemistry is $K_{0.5}Mg_2Al_{4.5}Si_{4.5}O_{18}$ with an orthorhombic crystal structure, the following precursors are mixed together: 49.4 grams of mullite fibers, 39.6 grams of Isofrax fibers, and 1.2 grams of $K_2O$ particles. The following additives are also added to form an extrudable mixture: 16 grams of hydroxypropyl methylcellulose, 20 grams of carbon particles (−45 micron mesh grade), 9.7 grams of $MgCO_3$ as binder, and 70 grams of deionized water as a mixing fluid. The materials are mixed into the extrudable mixture and formed into 1" diameter honeycomb substrates by extrusion. The substrates are dried using a radio-frequency (RF) drying facility, followed by a sintering operation at 1,300° C. for two hours to form a porous honeycomb structure having about 89% porosity. More than 80% of all of the mullite fibers and Isofrax fibers utilized in the extrudable mixture reacted to form $K_{0.5}Mg_2Al_{4.5}Si_{4.5}O_{18}$ fibers having an orthorhombic crystal structure. In this embodiment, the coefficient of thermal expansion of the porous ceramic body is $0.7 \times 10-6/°$ C.

In a ninth illustrative example in which the target fiber chemistry is $Fe_{0.45}Mg_{1.55}Al_4Si_5O_{18}$ with an orthorhombic crystal structure, the following precursors are mixed together: 42 grams of mullite fibers, 46.9 grams of Isofrax fibers, and 11.1 grams of $Fe_2O_3$ particles. The following additives are also added to form an extrudable mixture: 16 grams of hydroxypropyl methylcellulose, 20 grams of carbon particles (−45 micron mesh grade), and 70 grams of deionized water. The materials are mixed into the extrudable mixture and formed into 1" diameter honeycomb substrates by extrusion. The substrates are dried using a radio-frequency (RF) drying facility, followed by a sintering operation at 1,300° C. for two hours to form a porous honeycomb structure having about 87% porosity. More than 80% of all of the mullite fibers and Isofrax fibers utilized in the extrudable mixture reacted to form $Fe_{0.45}Mg_{1.55}Al_4Si_5O_{18}$ fibers having an orthorhombic crystal structure. In this embodiment, the coefficient of thermal expansion of the porous ceramic body is $0.7 \times 10-6/°$ C.

In a tenth illustrative example, the targeted fiber chemistry is a modified cordierite structure which includes 10% cordierite fibers with 90% alumina silicate fibers. Thus, in this example there is no R to modify the cordierite structure, however modification from the cordierite structure is achieve by having less than 95% conversion of the precursor materials so that the ultimate fiber chemistry is a blend of cordierite and alumina silicate. The 90% alumina silicate with 10% cordierite fibrous material is prepared by mixing the following precursor materials to form an extrudable mixture: 96 grams of mullite fibers, 2.0 grams of Isofrax fibers, and 2.0 grams of $MgCO_3$ particles. The following additives are also added to the extrudable mixture: 16 grams of hydroxypropyl methylcellulose, 20 grams of carbon particles (−45 micron mesh grade), and 70 grams of deionized water. The materials are mixed and extruded to form 1" diameter honeycomb substrate. The substrate is dried using a radio-frequency (RF) drying facility, followed by a sintering operation at 1,300° C. for two hours to form a porous honeycomb structure having about 77% porosity. Only 10% of all of the mullite fibers and Isofrax fibers utilized in the extrudable mixture reacted to form $Mg_2Al_4Si_5O_{18}$ fibers. In this embodiment, the coefficient of thermal expansion of the porous ceramic body is $2.8 \times 10-6/°$ C.

We claim:

1. A method of manufacturing a fibrous material wherein at least about 5% of all fibers within the fibrous material have a $R_xMg_2Al_{4+x}Si_{5-x}O_{18}$ compositional structure or a $R_xMg_{2-x}Al_{4+x}Si_5O_{18}$ compositional structure, the method comprising:
   mixing at least two $R_xMg_2Al_{4+x}Si_{5-x}O_{18}$ precursor materials or $R_xMg_{2-x}Al_4Si_5O_{18}$ precursor materials to form a mixture, wherein one or more of the at least two $R_xMg_2Al_{4+x}Si_{5-x}O_{18}$ or $R_xMg_{2-x}Al_4Si_5O_{18}$ precursor materials is in a form of a fiber;
   extruding the mixture to create a fibrous body; and
   heat treating the fibrous body to form the fibrous material wherein x is greater than zero and R is an element other than Mg, Al, Si, or O.

2. The method of claim 1 wherein after heat treating at least about 25% of all fibers within the fibrous body have either the $R_xMg_2Al_{4+x}Si_{5-x}O_{18}$ compositional structure or the $R_xMg_{2-x}Al_4Si_5O_{18}$ compositional structure.

3. The method of claim 1 wherein one or more of the at least two $R_xMg_2Al_{4+x}Si_{5-x}O_{18}$ or $R_xMg_{2-x}Al_4Si_5O_{18}$ precursor materials is selected from the group consisting of: magnesia silica fibers, magnesium aluminate fibers, and alumina silicate fibers.

4. The method of claim 1 wherein the mixture further comprises one or more additives selected from the group consisting of a fluid, a binder, and a pore former.

5. The method of claim 4 wherein the one or more additives are substantially removed by heating the fibrous body.

6. A method of manufacturing a fibrous body including $R_xMg_2Al_{4+x}Si_{5-x}O_{18}$ or $R_xMg_{2-x}Al_4Si_5O_{18}$ fibers, the method comprising:
   mixing at least two $R_xMg_2Al_{4+x}Si_{5-x}O_{18}$ or $R_xMg_{2-x}Al_4Si_5O_{18}$ precursor materials to form a mixture, wherein one or more of the at least two $R_xMg_2Al_{4+x}Si_{5-x}O_{18}$ or $R_xMg_{2-x}Al_4Si_5O_{18}$ precursor materials is in a form of a fiber;
   reacting the at least two $R_xMg_2Al_{4+x}Si_{5-x}O_{18}$ or $R_xMg_{2-x}Al_4Si_5O_{18}$ precursor materials to form a plurality of fibers within the mixture that have $R_xMg_2Al_{4+x}Si_{5-x}O_{18}$ or $R_xMg_{2-x}Al_4Si_5O_{18}$ compositional structure; and
   shaping the mixture into the fibrous body, wherein at least about 5% of all fibers within the fibrous body have either the $R_xMg_2Al_{4+x}Si_{5-x}O_{18}$ compositional structure or the $R_xMg_{2-x}Al_4Si_5O_{18}$ compositional structure wherein x is greater than zero and R is an element other than Mg, Al, Si, or O.

7. The method of claim 6 wherein at least about 25% of all fibers within the fibrous body after reacting the at least two $R_xMg_2Al_{4+x}Si_{5-x}O_{18}$ or $R_xMg_{2-x}Al_4Si_5O_{18}$ precursor materials have the $R_xMg_2Al_{4+x}Si_{5-x}O_{18}$ or $R_xMg_{2-x}Al_4Si_5O_{18}$ compositional structure, respectively.

8. The method of claim 6 wherein at least about 20% of all fibers within the fibrous body are aligned in a common direction.

9. The method of claim 6 wherein one or more of the at least two $R_xMg_2Al_{4+x}Si_{5-x}O_{18}$ or $R_xMg_{2-x}Al_4Si_5O_{18}$ precursor materials is selected from the group consisting of: magnesia silica fibers, magnesium aluminate fibers, and alumina silicate fibers.

10. The method of claim 6 wherein the mixture further comprises one or more additives selected from the group consisting of a fluid, a binder, and a pore former.

11. The method of claim 10 wherein the one or more additives are substantially removed by heating the fibrous body.

12. A method of forming a porous honeycomb substrate, the method comprising:
   mixing at least two $R_xMg_2Al_{4+x}Si_{5-x}O_{18}$ or $R_xMg_{2-x}Al_4Si_5O_{18}$ precursor materials to form a mixture, wherein one or more of the at least two $R_xMg_2Al_{4+x}Si_{5-x}O_{18}$ or $R_xMg_{2-x}Al_4Si_5O_{18}$ precursor materials is in a form of a fiber;
   extruding the mixture to form a honeycomb substrate having a porosity of at least about 20%; and
   heat treating the honeycomb substrate to react the at least two $R_xMg_2Al_{4+x}Si_{5-x}O_{18}$ or $R_xMg_{2-x}Al_4Si_5O_{18}$ precursor materials to form a plurality of fibers having $R_xMg_2Al_{4+x}Si_{5-x}O_{18}$ or $R_xMg_{2-x}Al_4Si_5O_{18}$ compositional structure so that at least about 5% of all fibers within the honeycomb substrate have the $R_xMg_2Al_{4+x}Si_{5-x}O_{18}$ or $R_xMg_{2-x}Al_4Si_5O_{18}$ compositional structure wherein x is greater than zero and R is an element other than Mg, Al, Si, or O.

13. The method of claim 12 wherein after heat treating the honeycomb substrate at least about 25% of all fibers have the $R_xMg_2Al_{4+x}Si_{5-x}O_{18}$ or $R_xMg_{2-x}Al_4Si_5O_{18}$ compositional structure.

14. The method of claim 12 wherein one or more of the at least two $R_xMg_2Al_{4+x}Si_{5-x}O_{18}$ or $R_xMg_{2-x}Al_4Si_5O_{18}$ precursor materials is selected from the group consisting of: magnesia silica fibers, magnesium aluminate fibers, and alumina silicate fibers.

15. The method of claim 12 wherein the mixture further comprises one or more additives selected from the group consisting of a fluid, a binder, and a pore former.

16. The method of claim 15 wherein the one or more additives are substantially removed by heating the honeycomb substrate.

17. A $R_xMg_2Al_{4+x}Si_{5-x}O_{18}$ or $R_xMg_{2-x}Al_4Si_5O_{18}$ fibrous honeycomb body comprising:

a honeycomb array of walls defining channels between adjacent walls;

the walls comprising a plurality of $R_xMg_2Al_{4-x}Si_{5-x}O_{18}$ or $R_xMg_{2-x}Al_4Si_5O_{18}$ fibers bonded to form a porous structure having an open network of pores, wherein at least about 20% of the plurality of $R_xMg_2Al_{4+x}Si_{5-x}O_{18}$ or $R_xMg_{2-x}Al_4Si_5O_{18}$ fibers within the walls being aligned in a common direction wherein x is greater than zero and R is an element other than Mg, Al, Si, or O.

18. The $R_xMg_2Al_{4+x}Si_{5-x}O_{18}$ or $R_xMg_{2-x}Al_4Si_5O_{18}$ fibrous honeycomb body of claim 17, wherein the walls have a porosity of at least about 20%.

19. The $R_xMg_2Al_{4+x}Si_{5-x}O_{18}$ or $R_xMg_{2-x}Al_4Si_5O_{18}$ fibrous honeycomb body of claim 17 wherein the plurality of $R_xMg_2Al_{4+x}Si_{5-x}O_{18}$ or $R_xMg_{2-x}Al_4Si_5O_{18}$ fibers have an aspect ratio greater than 1 and less than or equal to 2,000.

20. The $R_xMg_2Al_{4+x}Si_{5-x}O_{18}$ or $R_xMg_{2-x}Al_4Si_5O_{18}$ fibrous honeycomb body of claim 17 further comprising a catalytic coating on the plurality of $R_xMg_2Al_{4+x}Si_5O_{18}$ or $R_xMg_{2-x}Al_4Si_5O_{18}$ fibers.

21. A filter comprising:

a housing including an inlet and an outlet; and the $R_xMg_2Al_{4+x}Si_{5-x}O_{18}$ or $R_xMg_{2-x}Al_4Si_5O_{18}$ fibrous honeycomb body of claim 17 disposed between the inlet and the outlet.

22. The filter of claim 21 further comprising at least one catalyst deposited on the plurality of $R_xMg_2Al_{4+x}Si_{5-x}O_{18}$ or $R_xMg_{2-x}Al_4Si_5O_{18}$ fibers of the walls.

* * * * *